US011641139B2

United States Patent
Remboski et al.

(10) Patent No.: US 11,641,139 B2
(45) Date of Patent: May 2, 2023

(54) LUBRICANT SUPPORTED ELECTRIC MOTOR

(71) Applicant: Neapco Intellectual Property Holdings, LLC, Farmington Hills, MI (US)

(72) Inventors: Donald Remboski, Ann Arbor, MI (US); Jacqueline Dedo, Wolverine Lake, MI (US); Mark Versteyhe, Oostkamp (BE)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 128 days.

(21) Appl. No.: 17/064,964

(22) Filed: Oct. 7, 2020

(65) Prior Publication Data

US 2021/0104925 A1    Apr. 8, 2021

Related U.S. Application Data

(60) Provisional application No. 62/912,138, filed on Oct. 8, 2019.

(51) Int. Cl.
*H02K 1/278*        (2022.01)
*H02K 1/2786*    (2022.01)
(Continued)

(52) U.S. Cl.
CPC .......... *H02K 1/278* (2013.01); *H02K 1/2786* (2013.01); *H02K 5/12* (2013.01); *H02K 9/19* (2013.01);
(Continued)

(58) Field of Classification Search
CPC .......... H02K 16/04; H02K 9/19; H02K 9/197; H02K 1/278; H02K 1/2781; H02K 1/2783; B60K 7/0007; F16N 2210/18
See application file for complete search history.

(56) References Cited

U.S. PATENT DOCUMENTS 2,983,832 A    5/1961    Macks
3,134,037 A    5/1964    Upton
(Continued)

FOREIGN PATENT DOCUMENTS

CN    103078460 A        5/2013
CN    109450138 A    *   3/2019
(Continued)

OTHER PUBLICATIONS

Machine Translation of CN 110212723 A (Year: 2019).*
(Continued)

*Primary Examiner* — Naishadh N Desai
(74) *Attorney, Agent, or Firm* — Dickinson Wright PLLC

(57) ABSTRACT

A lubricant supported electric motor includes an outer stator and an inner stator each extending around an axis in radially spaced relationship with one another. A rotor is rotatably disposed between the inner and outer stators to define an inner gap extending radially between the rotor and the inner stator and an outer gap extending radially between the rotor and the outer stator. A lubricant is disposed in both of the inner and outer gaps for supporting the rotor radially between the inner and outer stators. The lubricant supported motor with a two-sided radial flux configuration results in improved rotor-to-stator system stiffness to allow the lubricant supported electric motor to be used in high shock and high vibration environments, while also providing high torque in a small and lightweight design package.

17 Claims, 4 Drawing Sheets

(51) Int. Cl.
*H02K 9/19* (2006.01)
*H02K 5/12* (2006.01)
*B60K 7/00* (2006.01)

(52) U.S. Cl.
CPC ........ *B60K 7/0007* (2013.01); *F16N 2210/18* (2013.01)

(56) References Cited

U.S. PATENT DOCUMENTS

| | | | |
|---|---|---|---|
| 2010/0007225 A1* | 1/2010 | Platon | H02K 1/18 29/598 |
| 2014/0028142 A1* | 1/2014 | Kusase | H02K 16/04 310/198 |
| 2017/0098989 A1 | 4/2017 | Kitada | |
| 2019/0081537 A1* | 3/2019 | Kiyokami | H02K 7/006 |
| 2019/0093757 A1 | 3/2019 | Remboski | |
| 2021/0351658 A1* | 11/2021 | Jore | H02K 9/227 |

FOREIGN PATENT DOCUMENTS

| | | | |
|---|---|---|---|
| CN | 110212723 A * | 9/2019 | |
| DE | 102015207778 A1 | 11/2016 | |
| JP | S60219945 A | 11/1985 | |
| JP | 2009184656 A | 8/2009 | |
| WO | 2013022351 A1 | 2/2013 | |
| WO | WO-2013022351 A * | 2/2013 | ............. H02K 16/00 |
| WO | WO-2019025349 A1 * | 2/2019 | ............. H02K 1/265 |

OTHER PUBLICATIONS

Machine Translation of WO-2019025349-A1 (Year: 2019).*
Machine Translation of CN 109450138 A (Year: 2019).*
Search Report and Written Opinion regarding corresponding PCT App. No. PCT/US2020/054661; dated Dec. 17, 2020.

* cited by examiner

LUBRICANT SUPPORTED ELECTRIC MOTOR

CROSS-REFERENCE TO RELATED APPLICATION

The subject application claims priority to U.S. Provisional Patent Application Ser. No. 62/912,138 filed on Oct. 8, 2019, the entire disclosure of which is incorporated herein by reference.

FIELD OF THE DISCLOSURE

The present disclosure relates generally to electric devices, such as electric motors and electric generators. More specifically, the present disclosure relates generally to a lubricant supported electric motor.

BACKGROUND OF THE INVENTION

This section provides a general summary of background information and the comments and examples provided in this section are not necessarily prior art to the present disclosure.

Various drivelines in automotive, truck, and certain off-highway applications take power from a central prime mover and distribute the power to the wheels using mechanical devices such as transmissions, transaxles, propeller shafts, and live axles. These configurations work well when the prime mover can be bulky or heavy, such as, for example, various internal combustion engines ("ICE"). However, more attention is being directed towards alternative arrangements of prime movers that provide improved environmental performance, eliminate mechanical driveline components, and result in a lighter-weight vehicle with more space for passengers and payload.

"On wheel" motor configurations are one alternative arrangement for the traditional ICE prime mover that distributes the prime mover function to each or some of the plurality of wheels via one or more motors disposed proximate to, on, or within the plurality of wheels. For example, in one instance, a traction motor, using a central shaft though a rotor and rolling element bearings to support the rotor, can be utilized as the "on wheel" motor configuration. However, these electric motors are typically heavy and bulky, especially when used in high shock and high vibration environments, resulting in electric motors that require more space that desired. More specifically, to meet the requisite shock and vibration requirements, current electric motors increase the spindle/rotor system stiffness with large spindles, spindle bearings and motor end caps, each of which are heavier than normal components. These larger and heavier components consume valuable space in many applications and generally increase the overall mass and weight of the electric motor.

Further, in order to improve torque, current electric motors add stator windings and making the stator magnetic circuit even larger. However, these additions also take up package space and increase motor mass. Additionally, the torque improvement in electric motors is typically limited by stator winding package space constraints and stator magnetic saturation, especially in environments where space and/or weight is at a premium. Accordingly, there remains a continuing need for electric motors which improve performance during operation in high shock and vibration environments, while providing the lighter and smaller footprint sought from alternative prime mover implementations.

SUMMARY OF THE INVENTION

The subject invention is generally directed to a lubricant supported electric motor that includes an outer stator and an inner stator each extending around an axis in radially spaced relationship with one another. A rotor is rotatably disposed between the inner and outer stators to define an inner gap disposed radially between the rotor and the inner stator and an outer gap disposed radially between the rotor and the outer stator. A lubricant is disposed in both of the inner and outer gaps for supporting the rotor radially between the inner and outer stators. The lubricant supported motor with a two-sided radial flux configuration (i.e., including a rotor rotatably disposed between both an inner and outer stator) improves torque of the lubricant supported electric motor relative to prior designs with only a single stator. Additionally, the lubricant supported electric motor results in improved rotor-to-stator system stiffness to allow the lubricant supported electric motor to be used in high shock and high vibration environments, such as transportation and manufacturing, while also providing high torque output, albeit with a design that is light and small relative to the prior electric motors. Other advantages will be appreciated in view of the following more detailed description of the subject invention.

BRIEF DESCRIPTION OF THE DRAWINGS

The drawings described herein are for illustrative purposes only of selected aspects and not all possible implementations, and are not intended to limit the scope of the present disclosure.

DETAILED DESCRIPTION OF THE ENABLING EMBODIMENTS

Exemplary aspects of the lubricant supported electric motor in accordance with the present disclosure will now be more fully described. Each of these example embodiments are provided so that this disclosure is thorough and fully conveys the scope of the inventive concepts, features and advantages to those skilled in the art. To this end, numerous specific details are set forth such as examples of specific components, devices and mechanisms associated with the lubricant supported electric motor to provide a thorough understanding of each of the embodiments associated with the present disclosure. However, as will be apparent to those skilled in the art, not all specific details described herein need to be employed, the example embodiments may be embodied in many different forms, and thus should not be construed or interpreted to limit the scope of the disclosure.

Figure 1:
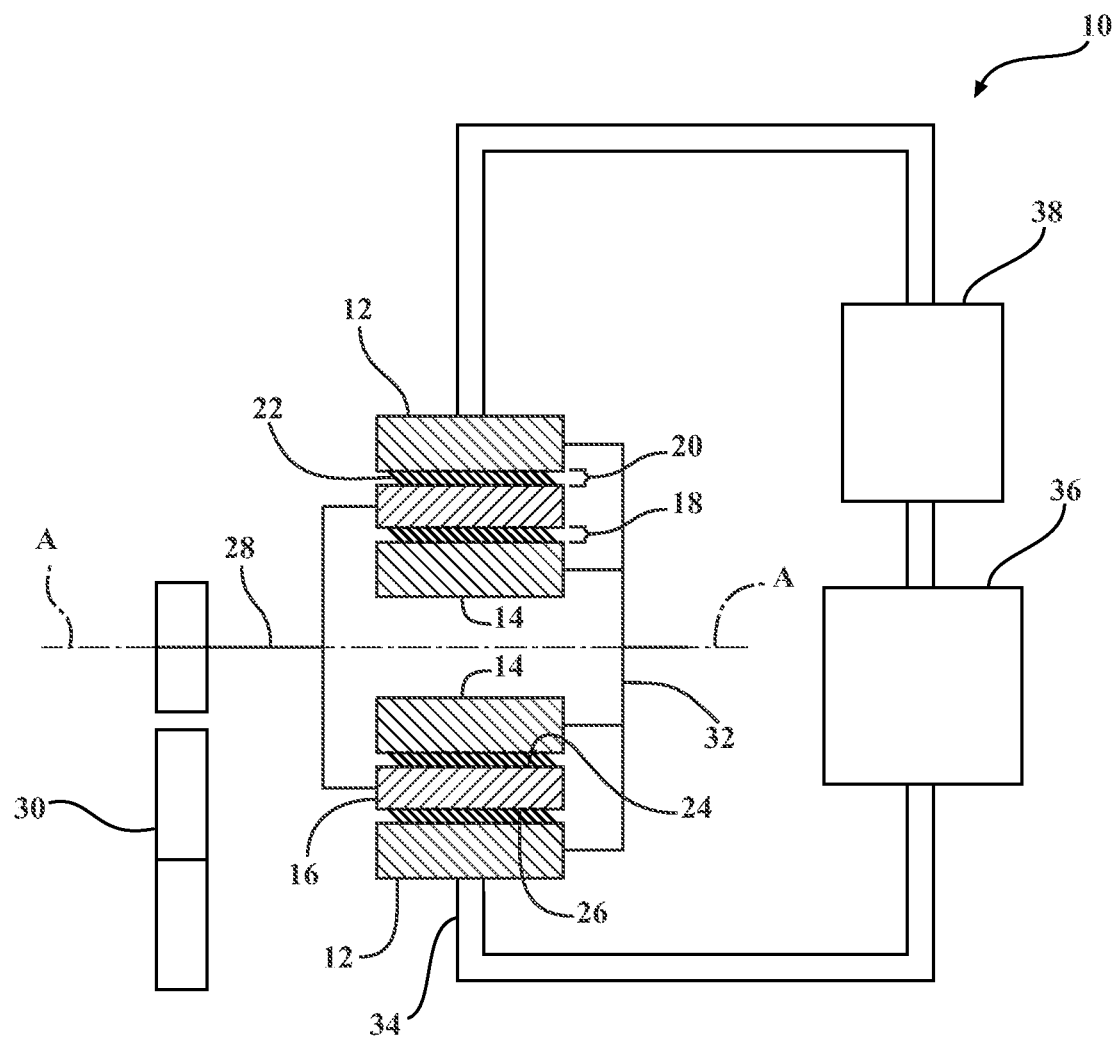
FIG. 1 is a cross-sectional side view of a first embodiment of a lubricant supported electric motor illustrating a rotor rotatably disposed between an inner stator and an outer stator.
Figure 2:
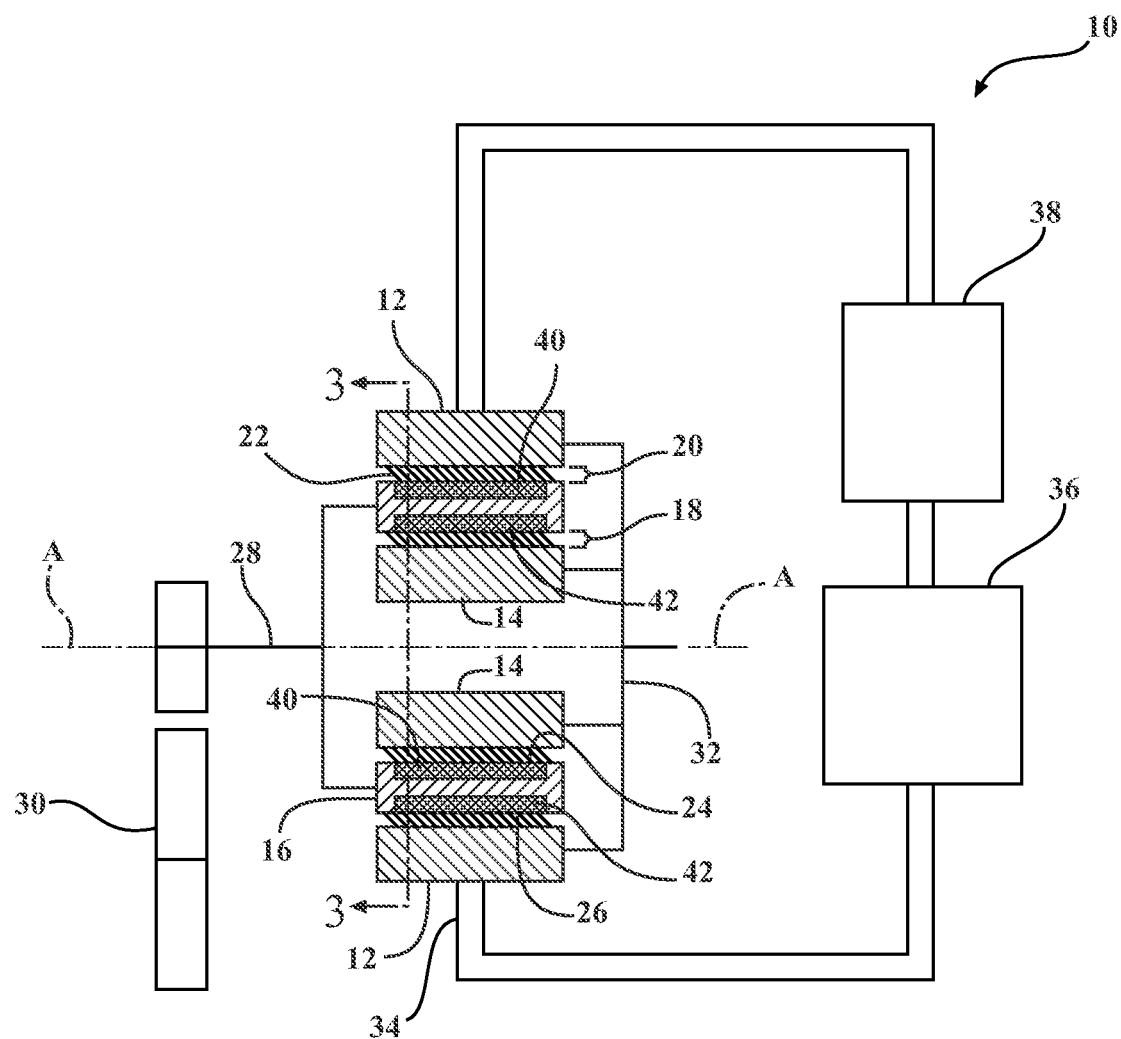
FIG. 2 is a cross-sectional side view of the lubricant supported electric motor illustrating a plurality of inner surface magnets disposed adjacent an inner rotor surface of the rotor and a plurality of outer surface magnets disposed adjacent an outer rotor surface of the rotor.

FIGS. 1-2 illustrate a lubricant supported electric motor 10 in accordance with an aspect of the disclosure. The lubricant supported electric motor 10 includes an outer stator 12 and an inner stator 14 each extending concentrically around an axis A in radially spaced relationship with one another. A rotor 16 also extends concentrically around the axis A in parallel and spaced relationship to the axis A and is rotatably disposed radially between the outer and inner stators 14 to define an inner gap 18 radially between the rotor 16 and the inner stator 14 and an outer gap 20 radially between the rotor 16 and the outer stator 12. A lubricant 22 is disposed in both the inner and outer gaps 18, 20 for supporting the rotor 16 between the inner and outer stators 12, 14 and providing a continuous contact between these components. The lubricant 22 may therefore act as a buffer (e.g., suspension) between the rotor 16 and the inner and outer stators 12, 14 minimizing or preventing contact therebetween. In other words, the lubricant 22 prevents direct contact between the rotor 16 and the inner and outer stators 12, 14 and provides a lubricant supported electric motor 10 which, as will be described in more detail immediately below, is robust to shock and vibration loading due to the presence of the lubricant 22.

The lubricant supported electric motor 10 arranged with a two-sided radial flux configuration (i.e., including a rotor 16 rotatably disposed between both the inner and outer stators 12, 14) is configured to improve a torque of the lubricant supported electric motor 10 versus the prior designs including only a single stator. Additionally, this arrangement improves rotor-to-stator system stiffness to allow the lubricant supported electric motor 10 to be used in high shock and high vibration environments, such as transportation and manufacturing. More specifically, as best illustrated in FIGS. 1-2, the rotor 16 includes an inner cylindrical rotor surface 24 disposed in adjacent and spaced relationship with the inner stator 14 and an outer cylindrical rotor surface 26 disposed in adjacent and spaced relationship with the outer stator 12. The lubricant 22 is arranged between both the inner and outer cylindrical rotor surfaces 24, 26 and the respective inner and outer stators 12, 14 to provide a very stiff support structure of the rotor 16 with respect to the inner and outer stators 12, 14. In other words, this configuration allows for the rotor 16 to be supported by the lubricant 22 acting against both the inner stator 14 and the outer stator 12, resulting in radial stiffness that sufficiently absorbs shock and vibration and has adequate torsional stiffness to withstand and contain output torque from the lubricant supported electric motor 10, albeit with a reduced package size and motor mass.

As discussed previously, the lubricant supported electric motor 10 is configured for use in transportation environments, such as a wheel supported electric motor on a vehicle driveline including one or more drive wheels. Although described in more detail in relation to a vehicle driveline, it is contemplated that the lubricant supported electric motor may also be incorporated in devices other than strictly transportation vehicles, such as toys, medical devices, construction equipment, robotic actuator joints, manufacturing equipment and may be connected to propulsion devices other than wheels and/or tires (tracks, propellers, turbines). With reference to FIGS. 1-2, when the lubricant supported electric motor 10 is implemented in a vehicle driveline, a rotor output shaft 28 is operably interconnected to the rotor 16 and extends along the axis for coupling the lubricant supported electric motor 10 to one of the plurality of wheels of a vehicle. In an arrangement, the rotor output shaft 28 can be operably connected to a driveline assembly 30, such as a planetary gear system, for establishing the operable connection to the respective wheel of the vehicle. Alternatively, the drive assembly 30 may include one or more parallel axis gears. However, in other implementations, the rotor output shaft 28 could be connected directly to the respective wheel of the vehicle, without a drive assembly and gear reduction unit employed, given the improved radial stiffness provided by the two-sided radial flux configuration of the lubricant supported electric motor 10. In either arrangement, and as further illustrated in FIG. 1-2, the inner and outer stators 12, 14 are interconnected via case connections 32 which are configured to secure the inner and outer stators 12, 14 in a static or fixed relationship relative to the rotor 16. The inner and outer stators 12, 14 along with the rotor 16 are configured to exert an electromagnetic force therebetween to convert electrical energy into mechanical energy, moving the rotor 16 and ultimately driving the wheel coupled to the lubricant supported electric motor 10. The drive assemblies 30, when present, may provide one or more reduction ratios between the lubricant supported electric motor 10 and the wheel in response to movement of the rotor 16. Additionally, due to the very stiff support structure of the lubricant supported electric motor 10, the rotor output shaft 28 may be configured as a lightweight cantilever that may need only a small amount of radial stiffness to absorb shock and vibration and only require sufficient torsional stiffness to conduct the output torque of the lubricant supported electric motor 10.

As further illustrated in FIGS. 1-2, at least one of the inner or outer stators 12, 14 defines a passageway 34 disposed in fluid communication with the inner and outer gaps 18, 20 for introducing the lubricant 22. For example, the outer stator 14 can define the passageway 34 to introduce lubricant 22 to the inner and outer gaps 18, 20. However, the passageway 34 can also be provided on both the inner and outer stators 12, 14 for introducing lubricant 22 to the respective inner and outer gaps 18, 20. In either arrangement, the lubricant 22 may be cycled or pumped through the passageway 34 and into the inner and outer gaps 18, 20 in various ways. For example, a high pressure source (e.g., a pump) 36 of the lubricant 22 may be fluidly coupled to a lower pressure source (e.g., a sump) 38, where the lubricant 22 may move from the lower pressure source 38 to the high pressure source 36, through the passageway 34 and into the inner and outer gaps 18, 20. Rotation of the rotor 16 relative to the inner and outer stators 12, 14 may also operate as a self-pump to drive lubricant 22 through the passageway 34 and into the inner and outer gaps 18, 20.

According to an aspect of the disclosure, cooling of the outer stator 12 and the inner stator 14 may also be accomplished by the same lubricant 22 that is used for bearing support of the rotor 16 within the inner and outer stators 12, 14. Thus, the passageway 34 may additionally supply lubricant 22 to the inner and outer stators 12, 14, with the lubricant supported electric motor 10 including a common fluid supply for both bearing support and for cooling of the inner stator 14 and the outer stator 12. However, the lubricant supported electric motor 10 may also include separate lubricant supplies, one lubricant supply dedicated to cooling the inner stator 14 and the outer stator 12, and another fluid supply for bearing support.

Figure 3:
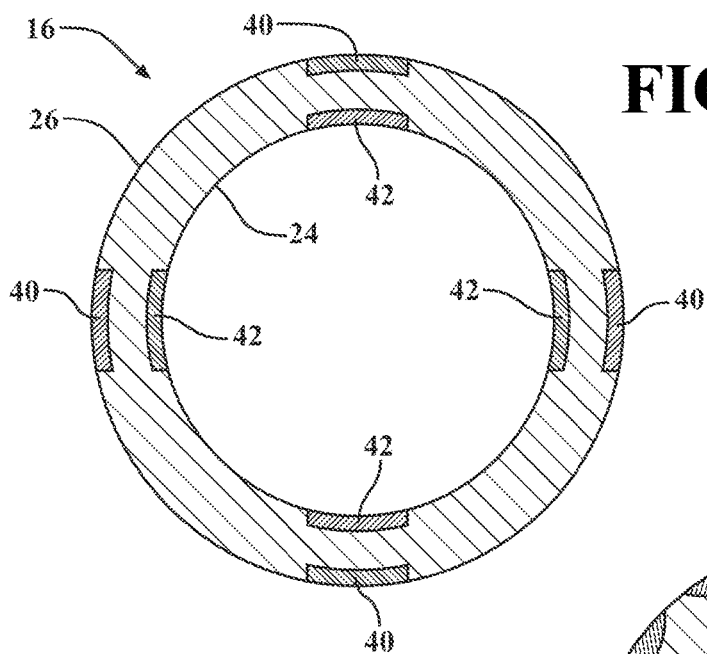
FIG. 3 is a cross-sectional end view taken along 3-3 of FIG. 2 illustrating each of the plurality of inner and outer surface magnets disposed circumferentially around the rotor in spaced relationship with one another.

As illustrated in FIG. 2, according to an aspect of the disclosure, the lubricant supported electric motor 10 may be configured with a plurality of surface magnets 40, 42 disposed adjacent both the inner and outer cylindrical rotor surfaces 24, 26 of the rotor 16 for establishing magnetic fields adjacent both the inner and outer stators 12, 14. For example, as best illustrated in FIG. 3, according to an aspect, the rotor 16 can include a plurality of outer surface magnets 40 disposed circumferentially around the rotor 16 in spaced relationship with one another and arranged adjacent the outer cylindrical rotor surface 26 and a plurality of inner surface magnets 42 disposed circumferentially around the rotor 16 in spaced relationship with one another and arranged adjacent the inner cylindrical rotor surface 24. In a preferred arrangement, each one of the plurality of outer surface magnets 40 are disposed in diametrically opposed and radially aligned relationship with a respective one of the plurality of inner surface magnets 42. Additionally, as illustrated in FIG. 3, each of the plurality of outer and inner surface magnets 40, 42 are circumferentially spaced from one another by approximately 90 degrees. However, the plurality of outer and inner surface magnets can be circumferentially spaced from one another in other arrangements (e.g., 60 degrees apart, 45 degrees apart, 30 degrees apart, or 15 degrees apart) without departing from the scope of the subject disclosure.

Figure 4:
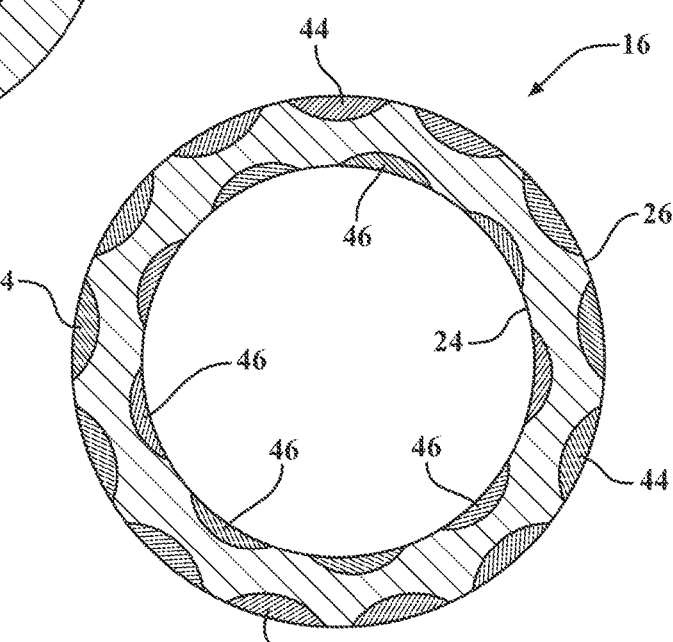
FIG. 4 is a cross-sectional end view illustrating a second arrangement of the rotor including a plurality of salient features comprised of non-magnetic material disposed adjacent and circumferentially arranged along both the inner and outer rotor surfaces.

With reference to FIG. 4, in accordance with another aspect of the disclosure, the rotor 16 is comprised substantially of a magnetic material (e.g., iron) and includes a plurality of salient features 44, 46 comprised of non-magnetic material (e.g., copper, gold, aluminum) disposed adjacent and circumferentially arranged along both the inner and outer cylindrical rotor surfaces 24, 26 of the rotor 16 in spaced relationship to one another. Similar to the other arrangement, and as best illustrated in FIG. 4, the rotor 16 can include a plurality of outer salient features 44 disposed circumferentially around the rotor 16 in spaced relationship to one another and arranged adjacent the outer cylindrical rotor surface 26 and a plurality of inner salient features 44 disposed circumferentially around the rotor 16 in spaced relationship to one another and arranged adjacent the inner cylindrical rotor surface 24. In a preferred arrangement, the plurality of outer salient features 42 are disposed in radially offset relationship with the plurality of inner salient features 46. The magnetic portion of the rotor 16 may be configured as an iron lamination stack, though other configurations of the rotor 16 are contemplated.

Figure 5:
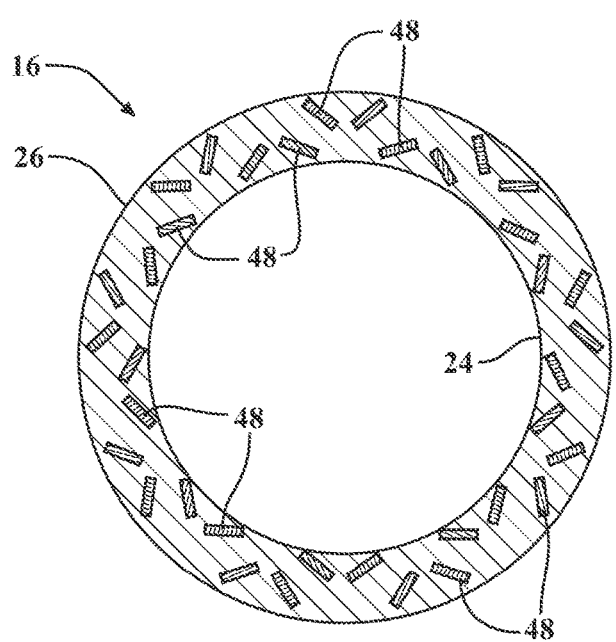
FIG. 5 is a cross-sectional end view illustrating a third arrangement of the rotor including a plurality of buried magnets randomly dispersed throughout the rotor.

With reference to FIG. 5, in accordance with another aspect of the disclosure, the rotor 16 can include a plurality of buried magnets 48 randomly dispersed throughout the rotor 16 to establish the magnetic field adjacent both the inner and outer cylindrical rotor surfaces 24, 26, in proximity to the inner and outer stators 12, 14. The plurality of buried magnets 48 may be configured in a pattern, such as shown in FIG. 5, including some buried magnets 48 directed to generate an interior magnetic field (i.e., adjacent the inner cylindrical rotor surface 24 and the inner stator 14) and other ones of the buried magnets 48 configured to generate an exterior magnetic field (i.e., adjacent the outer cylindrical rotor surface 26 and the outer stator 16). According to another aspect of the disclosure, the plurality of buried magnets 48 may be arranged only within a portion of the rotor 16, such as to generate only an interior magnetic field or only an exterior magnetic field. According to an aspect of the disclosure, the configuration of the buried magnets 48 may be consistent (i.e., regular), may be inconsistent (i.e., dissimilar), or may be irregular within the rotor 16. Similar to the other arrangements, the remaining portion of the rotor 16 may be configured as an iron lamination stack.

As will be appreciated in view of the above-mentioned disclosure, and as correspondingly illustrated in FIGS. 3-5, the inner and outer cylindrical rotor surfaces 24, 26 of the rotor 16 can be configured with different magnetic configurations or different blends (i.e., combinations) of magnetic configurations. For example and without limitation, the inner cylindrical rotor surface 24 may include a surface magnet such that magnet retention may be easy, while the outer cylindrical rotor surface 26 may use a magnetic reluctance configuration. In this configuration, both the inner and outer cylindrical rotors surfaces 24, 26 may produce torque using different magnetic configurations. Alternatively, the rotor 16 may be configured as an electromagnetic rotor with windings around a magnetic core that creates magnetic fields along both the inner and outer cylindrical rotor surfaces 24, 26 of the rotor 16. In this arrangement, electric current can be conducted to the rotor 16 with a slip ring type commutator or a similar mechanism. The rotor 16 may also be configured as an induction type rotor where the rotor magnetic field is created by currents induced by the rotor 16 by the action of the stator magnetic fields.

According to an aspect of the disclosure, the bearing support provided between the rotor 16 and each of the inner and outer stators 12, 14 may be configured as a hydrodynamic bearing support, a hydrostatic bearing support, or a hybrid combination of both hydrodynamic bearing support and hydrodynamic bearing support. These three bearing support techniques may be used in varying proportions along and adjacent both the inner cylindrical rotor surface 24 and the outer cylindrical rotor surface 26 of the rotor 16. For example and without limitation, a bearing surface of the inner stator 14 may be configured for a more efficient hydrodynamic bearing support, whereas a bearing surface of the outer stator 12 may lend itself to be configured as a more efficient hydrostatic bearing support.

Figure 6:
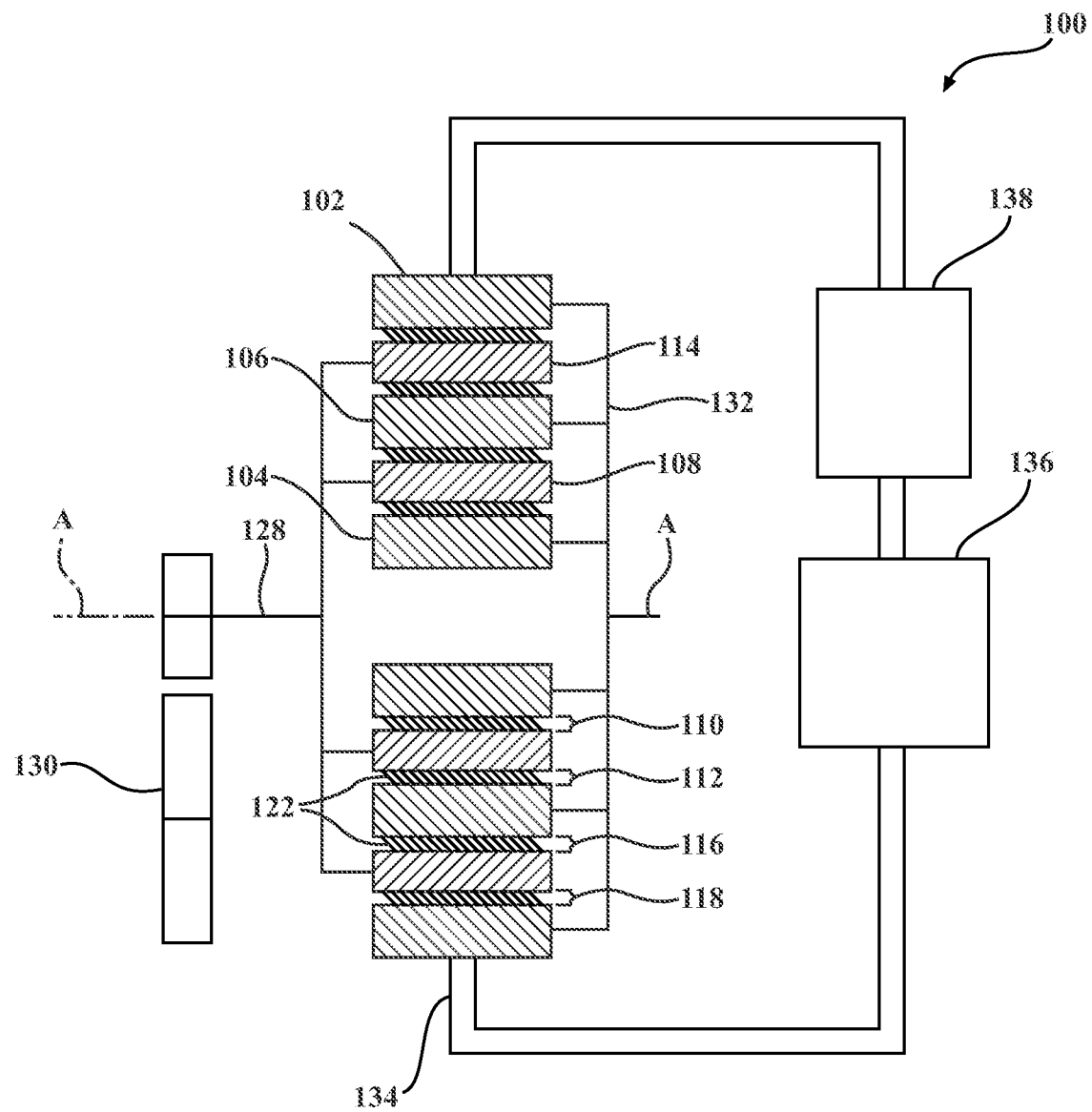
FIG. 6 is a cross-sectional side view of a second embodiment of the lubricant supported electric motor illustrating a first rotor rotatably disposed between an inner stator and a center stator and a second rotor rotatably disposed between the center stator and an outer stator.

FIG. 6 illustrates a second embodiment of a lubricant supported electric motor 100 in accordance with another aspect of the disclosure. Similar to the first embodiment, the lubricant supported electric motor 100 includes an outer stator 102 and an inner stator 104 each extending concentrically around an axis A in radially spaced relationship with one another. However, in the second embodiment, the lubricant supported electric motor 100 includes an additional center stator 106 extending concentrically around the axis A and disposed in radially spaced relationship between both the outer and inner stators 104, such as centered between the inner and outer stators 102, 104. A first rotor 108 extends concentrically around the axis A in parallel and spaced relationship to the axis A and is rotatably disposed between the inner and center stators 104, 106 to define a first inner gap 110 between the first rotor 108 and the inner stator 104 and a first outer gap 112 between the first rotor 108 and the center stator 106. A second rotor 114 extends concentrically around the axis A in parallel and spaced relationship to the axis A and is rotatably disposed between the outer and center stators 102, 106 to define a second inner gap 116 between the second rotor 114 and the center stator 106 and a second outer gap 118 between the second rotor 114 and the outer stator 102. A lubricant 122 is disposed in each of the first and second inner and outer gaps 110, 112, 116, 118 for supporting the first rotor 108 between the inner and center stators 104, 106 and supporting the second rotor 114 between the outer and center stators 102, 106 and providing a continuous contact between these components. Similar to the first embodiment, the lubricant 122 may therefore act as a buffer (e.g., suspension) between the first and second rotor 108, 114 and the inner, outer and center stators 102, 104, 106 minimizing or preventing contact therebetween. In other words, the lubricant 122 prevents direct contact between the first and second rotors 108, 114 and the inner, outer and center stators 102, 104, 106 and provides a lubricant supported electric motor 100 which is even more robust to shock and vibration loading due to the presence of the multiple rotors and stators. The use of multiple rotors 108, 114 and multiple stators 102, 104, 106 provides an "inter-digitated" lubricant supported electric motor 100 which creates multiple torque producing surfaces, further improving torque of the lubricant supported electric motor 100 relative to prior designs with only a single stator.

Similar to the first embodiment, and as further illustrated in FIG. 6, at least one of the inner or outer stators 102, 104 defines a passageway 134 disposed in fluid communication with the first and second inner and outer gaps 110, 112, 116, 118 for introducing the lubricant 122. For example, the outer stator 104 can define the passageway 134 to introduce lubricant 122 to the first and second inner and outer gaps 110, 112, 116, 118. However, the passageway 134 can also be provided on both the inner and outer stators 102, 104, or even on the center stator 106, for introducing lubricant 122 to the respective first and second inner and outer gaps 110, 112, 116, 118. In either arrangement, the lubricant 122 may be cycled or pumped through the passageway 134 and into the first and second inner and outer gaps 110, 112, 116, 118 in various ways. For example, a high pressure source (e.g., a pump) 136 of the lubricant 122 may be fluidly coupled to a lower pressure source (e.g., a sump) 138, where the lubricant 122 may move from the lower pressure source to the high pressure source, through the passageway 132 and into the first and second inner and outer gaps 110, 112, 116, 118. Rotation of the first and second rotors 108, 114 relative to the inner, outer and center stators 102, 104, 106 may also operate as a self-pump to drive lubricant 122 through the passageway 132 and into the first and second inner and outer gaps 110, 112, 116, 118.

With reference to FIG. 6, when the lubricant supported electric motor 100 is implemented in a vehicle driveline, a rotor output shaft 128 is operably interconnected to the first and second rotors 108, 114 and extends along the axis for coupling the lubricant supported electric motor 100 to one of the plurality of wheels of a vehicle. In an arrangement, the rotor output shaft 128 can be operably connected to a driveline assembly 130, such as a planetary gear system, for establishing the operable connection to the respective wheel of the vehicle. Alternatively, the drive assembly 130 may include one or more parallel axis gears. However, in other implementations, the rotor output shaft 128 could be connected directly to the respective wheel of the vehicle, without a drive assembly and gear reduction unit employed, given the improved radial stiffness provided by the three-sided radial flux configuration of the lubricant supported electric motor 100. In either arrangement, and as further illustrated in FIG. 6, the inner, outer and center stators 102, 104, 106 are interconnected via case connections 132 which are configured to secure the inner, outer and center stators 102, 104, 106 in a static or fixed relationship relative to the first and second rotors 108, 114. The inner, outer and center stators 102, 104, 106 along with the first and second rotor 108, 114 are configured to exert an electromagnetic force therebetween to convert electrical energy into mechanical energy, moving the first and second rotors 108, 114 and ultimately driving the wheel coupled to the lubricant supported electric motor 100. The drive assemblies 130, when present, may provide one or more reduction ratios between the lubricant supported electric motor 100 and the wheel in response to movement of the first and second rotor 108, 114. Additionally, due to the very stiff support structure of the lubricant supported electric motor 100, the rotor output shaft 128 may be configured as a lightweight cantilever that may need only a small amount of radial stiffness to absorb shock and vibration and only require sufficient torsional stiffness to conduct the output torque of the lubricant supported electric motor 100.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not regarded as a departure from the disclosure, and all such modifications are intended to be included within the scope of the disclosure.

What is claimed is:

1. A lubricant supported electric motor comprising:
an outer stator and an inner stator each extending around an axis in radially spaced relationship with one another;
a rotor rotatably disposed between said inner and outer stators to define an inner gap extending radially between said rotor and said inner stator and an outer gap extending radially between said rotor and said outer stator; and
a lubricant disposed in both of said inner and outer gaps and individually supporting said rotor radially between said inner and outer stators.

2. The lubricant supported electric motor as set forth in claim 1, wherein said rotor includes an inner rotor surface disposed in adjacent and spaced relationship with said inner stator and an outer rotor surface disposed in adjacent and spaced relationship with said outer stator, and said rotor including a plurality of surface magnets disposed adjacent both said inner and outer rotor surfaces.

3. The lubricant supported electric motor as set forth in claim 2, wherein said plurality of surface magnets include a plurality of outer surface magnets arranged adjacent said outer rotor surface in circumferentially spaced relationship to one another and a plurality of inner surface magnets arranged adjacent said inner surface in circumferentially spaced relationship to one another.

4. The lubricant supported electric motor as set forth in claim 3, wherein each one of said plurality of outer surface magnets are disposed in diametrically opposed and radially aligned relationship with a respective one of said plurality of inner surface magnets.

5. The lubricant supported electric motor as set forth in claim 3, wherein each of the plurality of outer and inner surface magnets are circumferentially spaced from adjacent ones of said plurality of outer and inner surface magnets by approximately 90 degrees.

6. The lubricant supported electric motor as set forth in claim 1, wherein said rotor includes an inner rotor surface disposed in adjacent and spaced relationship with said inner stator and an outer rotor surface disposed in adjacent and spaced relationship with said outer stator, and said rotor including a plurality of salient features comprised of non-magnetic material disposed adjacent both said inner and outer rotor surfaces.

7. The lubricant supported electric motor as set forth in claim 6, wherein said plurality of salient features include a plurality of outer salient features arranged adjacent said outer rotor surface in circumferentially spaced relationship to one another and a plurality of inner salient features arranged adjacent said inner surface in circumferentially spaced relationship to one another.

8. The lubricant supported electric motor as set forth in claim 7, wherein said plurality of outer salient features are arranged in radially offset relationship relative to said plurality of inner salient features.

9. The lubricant supported electric motor as set forth in claim 1, wherein said rotor includes a plurality of buried magnets dispersed randomly throughout said rotor.

10. The lubricant supported electric motor as set forth in claim 1, further comprising a rotor output shaft operably interconnected to said rotor and extending along the axis for operably coupling the lubricant supported electric motor to a wheel of a vehicle.

11. The lubricant supported electric motor as set forth in claim 10, wherein said rotor output shaft is operably connected to a driveline assembly for establishing said operable connection to the wheel of the vehicle.

12. The lubricant supported electric motor as set forth in claim 1, wherein at least one said inner or outer stators defines a passageway disposed in fluid communication with said inner and outer gaps for introducing said lubricant.

13. The lubricant supported electric motor as set forth in claim 1, wherein each of said rotor, said inner stator and said outer stator extend circumferentially around said axis.

14. A lubricant supported electric motor comprising:
an outer stator and an inner stator each extending around an axis in radially spaced relationship with one another;
a center stator disposed in radially spaced relationship between both of said inner and outer stators;
a first rotor rotatably disposed between said inner and center stators to define a first inner gap extending radially between said first rotor and said inner stator and a first outer gap extending radially between said first rotor and said center stator;
a second rotor rotatably disposed between said outer and center stators to define a second inner gap extending radially between said second rotor and said center stator and a second outer gap extending radially between said second rotor and said outer stator; and
a lubricant disposed in each of said first and second inner and outer gaps and individually supporting said first rotor radially between said inner and center stators and individually supporting said second rotor radially between said center and outer stators.

15. The lubricant supported electric motor as set forth in claim 14, further comprising a rotor output shaft operably interconnected to said first and second rotors and extending along the axis for operably coupling the lubricant supported electric motor to a wheel of a vehicle.

16. The lubricant supported electric motor as set forth in claim 14, wherein at least one said inner or outer stators defines a passageway disposed in fluid communication with said first and second inner and outer gaps for introducing said lubricant.

17. The lubricant supported electric motor as set forth in claim 14, wherein each of said first rotor, said second rotor, said inner stator, said center stator and said outer stator extend circumferentially around said axis.

* * * * *